United States Patent
Dufaure et al.

(10) Patent No.: US 8,586,672 B2
(45) Date of Patent: Nov. 19, 2013

(54) METHOD FOR INCREASING POLYMER COMPATIBILITY

(75) Inventors: Nicolas Dufaure, Bernay (FR); Francois Genes Tournilhac, Paris (FR); Manuel Hidalgo, Brignais (FR); Ludwik Leibler, Paris (FR)

(73) Assignees: Arkema France, Colombes (FR); CNRS, Paris (FR)

( * ) Notice: Subject to any disclaimer, the term of this patent is extended or adjusted under 35 U.S.C. 154(b) by 0 days.

(21) Appl. No.: 13/119,779

(22) PCT Filed: Sep. 17, 2009

(86) PCT No.: PCT/FR2009/051747
§ 371 (c)(1),
(2), (4) Date: Jun. 23, 2011

(87) PCT Pub. No.: WO2010/031965
PCT Pub. Date: Mar. 25, 2010

(65) Prior Publication Data
US 2011/0245421 A1   Oct. 6, 2011

(30) Foreign Application Priority Data

Sep. 19, 2008 (FR) ..................................... 08 56334

(51) Int. Cl.
| | |
|---|---|
| *C08F 8/30* | (2006.01) |
| *C08F 8/32* | (2006.01) |
| *C08L 33/00* | (2006.01) |
| *C08L 39/04* | (2006.01) |
| *C08L 23/26* | (2006.01) |
| *C08L 51/06* | (2006.01) |
| *C08L 77/00* | (2006.01) |
| *C08G 69/48* | (2006.01) |

(52) U.S. Cl.
USPC .............................................. 525/65; 525/66

(58) Field of Classification Search
USPC ................................................ 525/64, 66, 65
See application file for complete search history.

(56) References Cited

U.S. PATENT DOCUMENTS

| | | | |
|---|---|---|---|
| 5,041,504 A | 8/1991 | Brown et al. | |
| 6,362,278 B1 | 3/2002 | Pfaendner et al. | |
| 7,300,978 B2 | 11/2007 | Pfaendner et al. | |
| 7,807,757 B2 | 10/2010 | Pfaendner et al. | |
| 2002/0123577 A1 | 9/2002 | Pfaendner et al. | |
| 2003/0236356 A1* | 12/2003 | Syed .......................... | 525/333.7 |
| 2004/0167291 A1 | 8/2004 | Pfaendner et al. | |
| 2008/0051521 A1 | 2/2008 | Pfaendner et al. | |
| 2008/0221272 A1* | 9/2008 | Tournilhac et al. ........... | 525/194 |

FOREIGN PATENT DOCUMENTS

| | | |
|---|---|---|
| EP | 0 374 517 A2 | 11/1989 |
| WO | WO/98/18830 | 5/1998 |
| WO | WO 2006/016041 A1 | 2/2006 |

OTHER PUBLICATIONS

International Search Report of PCT/FR2009/051747 (Jan. 5, 2010).
Office Action for related Japanese Patent Application No. 2011-527380, dated Nov. 15, 2012.
English Translation of Office Action for related Japanese Patent Application No. 2011-527380, dated Nov. 15, 2012.

* cited by examiner

*Primary Examiner* — Jeffrey Mullis
(74) *Attorney, Agent, or Firm* — Millen, White, Zelano & Branigan, P.C.

(57) ABSTRACT

The invention relates to a method for increasing the compatibility between at least two polymers, which comprises: (a) selecting at least two immiscible polymers (A) and (B), at least one of which does not bear a nitrogenous heterocycle-based associative group, and (b) modifying the polymer (A) and/or the polymer (B) so as to obtain a blend of polymers (Pi) which are derived from the polymers (A) and (B) and which each bear nitrogenous heterocycle-based associative groups, said associative groups being present in sufficient amount for the polymers (Pi) to be more compatible with one another than the polymers (A) and (B). It also relates to the polymer composition that can be obtained according to this method.

10 Claims, 1 Drawing Sheet

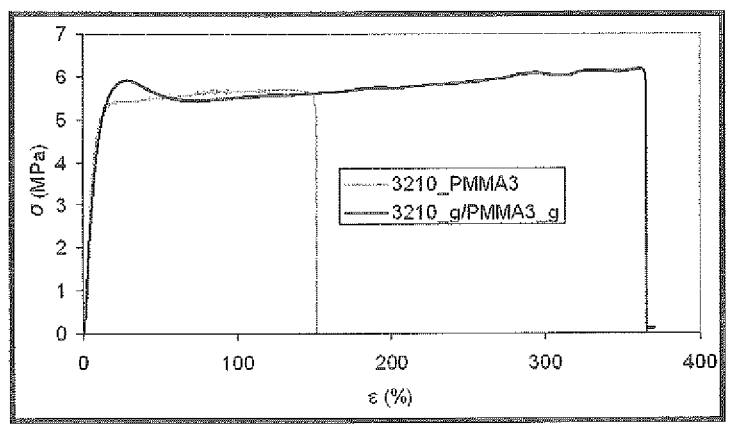

METHOD FOR INCREASING POLYMER COMPATIBILITY

The present invention relates to a process for increasing the compatibility or the affinity between at least two mutually immiscible polymers, comprising the introduction of associative groups onto the polymers. It also relates to the polymer composition obtained according to this process.

Various approaches have been envisaged for the purpose of improving the compatibility and consequently the properties of blends of polymers. Thus, it was suggested, in the documents FR 2 893 944 and WO 2005/103145, to compatibilize a blend of PMMA with a polyamide by adding thereto, as compatibilizing agent, a polyamide-grafted methyl methacrylate homo- or copolymer.

Furthermore, the document WO 2006/016041 discloses a polymer material carrying imidazolidone functional groups. This material can be used to compatibilize two polymers belonging to different classes of polymers. In alternative form, two materials of this type can be associated in order to form "block copolymers", the two blocks of which are joined together via hydrogen bonds between the associative groups carried by each block; however, it is not suggested that this association would make it possible to associate polymers which are initially incompatible.

The need nevertheless remains to provide a novel process for the preparation of compatibilized blends of polymers starting from immiscible polymers, said blends exhibiting improved mechanical and/or chemical and/or optical properties in comparison with the same uncompatibilized blends of polymers.

In point of fact, it appeared to the Applicant Company that two immiscible polymers might be rendered more compatible by modifying them chemically, without it being necessary to add to them a third polymer used as compatibilizer. In addition, it has been demonstrated that it is thus possible to obtain a blend of polymers exhibiting improved properties in comparison with the blend of immiscible polymers.

The subject matter of the present invention is thus a process for increasing the compatibility between at least two polymers, comprising:
 (a) the selection of at least two immiscible polymers (A) and (B), at least one of which does not carry an associative group based on a nitrogenous heterocycle,
 (b) the modification of the polymer (A) and/or of the polymer (B) in order to obtain a blend of polymers (Pi) resulting from the polymers (A) and (B) which each carry associative groups based on a nitrogenous heterocycle, said associative groups being present in an amount sufficient for the polymers (Pi) to be more compatible with one another than the polymers (A) and (B).

Another subject matter of the invention is a composition formed of polymers which is capable of being obtained according to this process.

This process makes it possible to obtain blends of polymers exhibiting improved properties, in particular a greater resistance to solvents, a greater impact strength, a greater elongation at break, a greater tensile strength and/or a greater modulus. The greater compatibility of the polymers is reflected in addition by a finer dispersion of one polymer in the other, indeed even by the obtaining of cocontinuous phases of the two polymers, which results in a greater transparency of the blend, and by a reduced detachment between the interfaces of the two polymers, that is to say by a greater stability of the blend.

The stages of the process according to the invention and the reactants used for its implementation will now be described in more detail.

By way of preamble, it should be noted that the expression "comprised between" should be interpreted, in the present description, as including the limits cited.

Polymers (A) and (B)

The polymers (A) and (B) can be composed of any homo- and copolymer, provided that they are immiscible.

The immiscibility between the two polymers can be demonstrated by various analytical methods known to a person skilled in the art, such as scanning electron microscopy (SEM), transmission electron microscopy (TEM) or atom force microscopy (AFM), which make it possible to detect non-homogeneities in the blends. The two polymers are regarded as being immiscible within the meaning of the present invention when the blend includes such homogeneity defects.

The immiscibility of the two polymers can also be demonstrated by glass transition temperature (Tg) measurements. A blend of two polymers is regarded as completely homogenous when it exhibits a single glass transition temperature. The polymers are immiscible when it is possible to detect at least two glass transition temperatures. The methods for measuring the Tg of polymers and blends of polymers are known to a person skilled in the art and include differential scanning calorimetry (DSC), volumetric analysis or dynamic mechanical analysis (DMA).

The polymers (A) and (B) can be chosen in particular from: polyamides, acrylic homo- and copolymers, polycarbonate, polyesters, halogenated vinyl polymers, olefinic homo- and copolymers, acrylonitrile copolymers, polyethers and polymers of plant or bacterial origin, such as poly(lactic acid) or poly-hydroxyalkanoates.

Mention may in particular be made, as polyamides, of the homo- and copolymers obtained by polymerization of lactam monomers (in particular caprolactam or lauryl-lactam) and/or of $\alpha,\omega$-aminocarboxylic acid monomers (such as 11-aminoundecanoic acid or 12-aminododecanoic acid). Mention may also be made of the polymers composed of monomers obtained by reaction of an aliphatic, cycloaliphatic or aromatic $C_6$-$C_{14}$ dicarboxylic acid (such as adipic acid, sebacic acid and n-dodecanedioic acid) with an aliphatic, cycloaliphatic, arylaliphatic or aromatic $C_6$-$C_{22}$ diamine (such as hexamethylenediamine, m-xylylenediamine or p-xylylenediamine). Mention may also be made of the copolymers including several different monomers chosen from those mentioned above.

Examples of acrylic polymers are the homo- and copolymers of (meth)acrylic acid and the homo- and copolymers of alkyl (meth)acrylate including, for example, at least one monomer chosen from: methyl methacrylate, ethyl methacrylate, propyl methacrylate, isopropyl methacrylate, n-butyl methacrylate, isobutyl methacrylate, tert-butyl methacrylate, n-butyl acrylate, isobutyl acrylate, tert-butyl acrylate, 2-ethylhexyl acrylate, hydroxyethyl acrylate, 2-ethyl-hexyl methacrylate, n-octyl acrylate and their mixtures. An example of acrylic polymer is a methyl methacrylate/methacrylic acid copolymer, such as that sold by Arkema under the tradename Altuglas® HT 121.

Mention may be made, as olefinic polymers, of poly-ethylenes, polypropylenes, hydrogenated or non-hydrogenated polybutadienes, hydrogenated or non-hydrogenated polyisoprene, hydrogenated or non-hydrogenated styrene/butadiene and styrene/isoprene copolymers, ethylene/vinyl alcohol (EVOH) copolymers, ethylene/vinyl acetate (EVA) copolymers, copolymers based on ethylene and on vinyl acetate and on maleic anhydride available from Arkema under the tradename Orevac®, copolymers based on propylene and on maleic anhydride also available under the name Orevac®, copolymers based on ethylene and on alkyl (meth)acrylate and/or on acid anhydride, such as the terpolymers including ethylene, at least one alkyl acrylate (such as butyl ethyl acrylate) and maleic anhydride available from Arkema under the tradename Lotader®, or styrene/maleic anhydride copolymers.

Use may be made, as polyesters, of any polymer or copolymer obtained by polycondensation of a diol with at least one diacid, one diester or one dianhydride or their mixtures or by polycondensation of at least difunctional monomers comprising functional groups which react with one another, such as hydroxycarboxylic acids, hydroxyesters, hydroxyanhydrides or their mixtures. Mention may be made, among these polyesters, of polyethylene terephthalate and polybutylene terephthalate.

Mention may be made, as examples of halogenated vinyl polymers, of chlorinated homopolymers or copolymers, such as:
poly(vinyl chloride) (PVC),
poly(vinylidene chloride),
copolymers of vinyl chloride and of at least one comonomer chosen from acrylonitrile, ethylene, propylene and vinyl acetate, and
copolymers of vinylidene chloride and of at least one comonomer chosen from vinyl chloride, acrylonitrile, acrylamide, methyl acrylate or methyl methacrylate,
but also fluorinated homo- or copolymers comprising one or more monomers of formula (I):

CFX=CHX'  (I)

where X and X' independently denote a hydrogen or halogen atom, in particular a fluorine or chlorine atom, or a perhalogenated alkyl radical, in particular a perfluorinated alkyl radical, with preferably X=F and X'=H.

These fluoropolymers are, for example:
poly(vinylidene fluoride) (PVDF),
copolymers of vinylidene fluoride with a halogenated comonomer preferably chosen from hexafluoropropylene (HFP), chlorotrifluoroethylene (CTFE), trifluoroethylene (VF3) or tetrafluoroethylene (TFE),
homopolymers and copolymers of trifluoroethylene (VF3),
fluoroethylene/propylene (FEP) copolymers,
copolymers of ethylene with fluoroethylene/propylene (FEP), tetrafluoroethylene (TFE), perfluoro-methyl vinyl ether (PFMVE), chlorotrifluoroethylene (CTFE) or hexafluoropropylene (HFP), and
their mixtures.

According to one embodiment of the invention, the polymer (A) is an acrylic polymer, such as a homo- or copolymer of alkyl (meth)acrylate, in particular a copolymer of methyl methacrylate and of methacrylic acid, and the polymer (B) is a polyamide. After employing the process according to the invention, the polyamide makes it possible to increase the chemical resistance to solvents and the resistance to temperature of the acrylic polymer, without substantially affecting the advantageous properties of the latter.

According to another embodiment of the invention, the polymer (A) is an acrylic polymer, such as a homo- or copolymer of alkyl (meth)acrylate, in particular a copolymer of methyl methacrylate and of methacrylic acid, and the polymer (B) is an olefinic copolymer, such as an ethylene/alkyl acrylate/maleic anhydride terpolymer. This olefinic copolymer makes it possible, after employing the process according to the invention, to increase the impact strength of the acrylic polymer, substantially without lowering its modulus.

According to another embodiment of the invention, the polymer (A) is an olefinic copolymer, such as an ethylene/butyl acrylate/maleic anhydride terpolymer, and the polymer (B) is a polyamide.

The polymers which can be used according to the invention can be obtained according to conventional polymerization techniques well known to a person skilled in the art.

In addition, one of the polymers (A) and (B) can carry associative groups based on a nitrogenous heterocycle, provided that at least one is devoid thereof before its modification according to the invention. Such groups may have been introduced onto said polymer during its polymerization, for example by copolymerizing a comonomer comprising such an associative group.

The polymers (A) and (B) can be present in a ratio by weight ranging from 1:99 to 99:1, for example in a ratio by weight ranging from 10:90 to 90:10.

Modification of the Polymers (A) and/or (B)

At least one of the immiscible polymers used in the process according to the invention is modified, in the second stage of this process, so as to obtain a blend (Pi) of polymers in which each of the polymers carries associative groups based on a nitrogenous heterocycle.

To do this, a modifying agent can be reacted with the polymer(s) to be modified. In the case where neither of the polymers (A) and (B) carries a nitrogenous heterocycle, the modifying agent is reacted with each of these polymers, which are taken either separately or as a blend.

More specifically, the modification of the polymer (A) and/or of the polymer (B) can be carried out by reaction of said polymer with a modifying agent carrying, on the one hand, an associative group based on a nitrogenous heterocycle and, on the other hand, a reactive group chosen, for example, from amine, mercaptan, epoxy, isocyanate, anhydride, alcohol or acid groups, preferably an amine group, said reactive group forming a covalent bond with a reactive functional group, such as an acid, anhydride, alcohol, mercaptan, amine, epoxy or isocyanate functional group, preferably an anhydride functional group, carried by said polymer (A) and/or (B).

The term "associative groups" is understood to mean groups capable of associating with one another via hydrogen bonds. They are, according to the invention, groups comprising a nitrogenous heterocycle, preferably a dinitrogenous heterocycle, generally having 5 or 6 ring members. Examples of associative groups which can be used according to the invention are imidazolidinyl, triazolyl, triazinyl, bisureyl or ureidopyrimidyl groups. The imidazolidinyl group is preferred. The modifying agent can thus correspond to any one of the formulae (B1) to (B4)

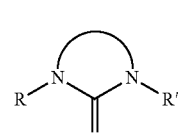
(B1)

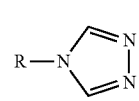
(B2)

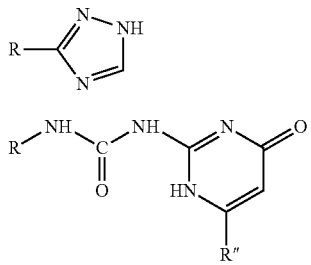

where:
R denotes a unit comprising at least one reactive group,
R' denotes a hydrogen atom,
R" denotes a hydrogen atom or any group,
A denotes an oxygen or sulfur atom or an —NH group, preferably an oxygen atom.

Preferred examples of modifying agents are 2-aminoethylimidazolidone (UDETA), 1-(2-[(2-aminoethyl)-amino] ethyl)imidazolidone (UTETA) , 1-(2-[{2-(2-aminoethylamino)ethyl}amino]ethyl)imidazolidone (UTEPA), N-(6-aminohexyl)-N'-(6-methyl-4-oxo-1,4-dihydropyrimidin-2-yl)urea (UPy), 3-amino-1,2,4-triazole (3-ATA) and 4-amino-1,2,4-triazole (4-ATA). UDETA is preferred for use in the present invention.

These compounds can be obtained by reaction of urea with a polyamine. For example, UDETA, UTETA and UTEPA can be respectively prepared by reacting urea with diethylenetriamine (DETA), triethylenetetramine (TETA) and tetraethylenepentamine (TEPA).

The grafting process is carried out by reacting the modifying agent and the polymer carrying the reactive functional groups.

This stage can be carried out in the molten state, for example in an extruder or an internal mixer, at a temperature which can range from 100° C. to 300° C. and preferably from 200° C. to 280° C. The modifying agent is blended with the polymer alone or with the help of an additive which makes possible the impregnation of the solid polymer particles by the premelted modifying agent. The solid blend, before introduction into the extruder or the mixer, can be rendered more homogeneous by refrigerating in order to solidify the modifying agent. It is also possible to meter the latter into the extruder or the mixer after the polymer to be grafted has started to melt. The time at the grafting temperature can range from 30 seconds to 5 hours, The modifying agent can be introduced into the extruder in the form of a masterbatch in a polymer, which can preferably be the polymer to be grafted. According to this method of introduction, the masterbatch can comprise up to 30% by weight of the modifying agent; subsequently, the masterbatch is "diluted" in the polymer to be grafted during the grafting operation.

According to another possibility, the grafting can be carried out by reaction in a solvent phase, for example in anhydrous chloroform. In this case, the reaction temperature can range from 5° C. to 75° C., for a time ranging from a few minutes to seven days and at polymer concentrations before grafting of between 1 and 60% by weight, with respect to the total weight of the solution.

The number of associative groups introduced onto the polymer must be sufficient to render the polymers (Pi) more compatible with one another than the polymers (A) and (B) from which they derive, in the sense that smaller domains or nodules of one polymer in the matrix formed by the other polymer of the blend (Pi) are observed, by scanning electron microscopy, transmission electron microscopy or atom force microscopy, than those observed in an equivalent blend of the polymers (A) and (B), indeed even a continuous dispersion of one polymer of the blend (Pi) in the other, and/or the cohesion of the nodule/matrix interface is greater, in the blend (Pi), than that measured in the blend of the polymers (A) and (B), that is to say that the strain or the stress resulting in the detachment of the interface is greater, and/or the haze index of the blend (Pi), as measured according to the standard ASTM D1003, is lower than that of an equivalent blend of the polymers (A) and (B).

The term "equivalent blend" is understood to mean that the polymers (A) and (B) are used in the same proportions as the polymers present in the blend (Pi), for the purposes of the abovementioned comparisons.

The number of associative groups can be adjusted by simply varying the amount of modifying agent or by adjusting the reaction time and temperature. It is generally preferable for the amount of modifying agent to represent from 0.5 to 20% by weight, more preferably from 1 to 10% by weight, with respect to the weight of the polymer carrying reactive functional groups and/or for the mean number of associative groups per polymer chain to be between 1 and 200 and/or for the level of monomers carrying associative group(s) to be at least 0.2%, preferably at least 1%, with respect to the total weight of the monomers forming the grafted polymer.

In the case where the reactive functional group carried by the polymer to be modified is an anhydride functional group, the latter can be created on said polymer, in an intermediate stage between the first and second stages of the process according to the invention, by cyclization of two neighboring acid functional groups. This cyclization process can advantageously be carried out under basic catalysis conditions. The preferred basic catalysts include sodium hydroxide and sodium methoxide $NaOCH_3$. The cyclization can be carried out by passing the polymer through a single- or twin-screw extruder in the presence of a catalyst and optionally of other additives, such as lubricants, antioxidants, dyes and/or optical correcters in order to give gloss and to reduce yellowing. The extrusion temperature can be between 200 and 300° C. and preferably between 250 and 280° C. One or more extrusion passes can be carried out in order to obtain the desired level of cyclization (for example, formation of glutaric anhydride). According to another possibility, the cyclization reaction can be carried out under high vacuum. The degree of cyclization can be controlled in order to adjust the level of anhydride functional groups obtained, which can, for example, range from 0.1 to 20 mol %.

In an alternative form, the anhydride functional group can be introduced into one or both polymers to be modified by grafting small anhydride molecules, such as maleic anhydride molecules, to the polymer or polymers. This reaction can be carried out by reactive extrusion. In an alternative form, the anhydride functional group can be created on said polymer (A) and/or (B) by radical grafting of maleic anhydride, generally in a solvent medium. These methods are well known to a person skilled in the art.

Composition Formed of Polymers

As indicated above, one of the polymers (A) and (B) can comprise associative groups based on a nitrogenous heterocycle, so that at least the other, and preferably just the other, polymer is modified in the process according to the invention. In an alternative form, it is possible for neither of the polymers (A) and (B) to comprise such associative groups, so that both are modified according to the invention. In these two alternative forms, the modifying stage can be carried out on the polymers as a blend or on the polymer(s) to be modified, taken separately. In the first case, the composition formed of polymers according to the invention is obtained directly. In the latter case, the polymers can, for example, be provided in the form of granules or of powders and the process according to the invention generally comprises a third stage of blending these polymers, in particular by calendering, extrusion, melt blending in a blending chamber, pressing, injection molding or dissolving in a common solvent, followed by a separation of the solvent, in order to obtain the composition formed of polymers according to the invention.

Various additives, including one or more plasticizers, can be added to this composition formed of polymers.

Other additives capable of being added to the composition formed of polymers according to the invention are in particular:
  lubricants, such as stearic acid and its esters, waxy esters, polyethylene waxes, paraffin wax or acrylic lubricants,
  dyes,
  inorganic or organic pigments, such as those described in the document "Plastics Additives and Modifers Handbook, Section VIII, Colorants", J. Edenbaum, Ed., Van Nostrand, pages 884-954. Mention may be made, as examples of pigments which can be used, of carbon black, titanium dioxide, clay, metal particles or treated mica particles of the Iriodin® brand sold by Merck,
  heat and/or UV stabilizers, such as tin stearate, lead stearate, zinc stearate, cadmium stearate, barium stearate or sodium stearate, including Thermolite® from Arkema,
  costabilizers, such as epoxidized natural oils,
  antioxidants, for example phenolic, sulfur-comprising or phosphite antioxidants,
  fillers or reinforcing agents, in particular cellulose fillers, talc, calcium carbonate, mica or wollastonite, glass or metal oxides or hydrates,
  antistatic agents,
  fungicides and biocides,
  impact modifiers, such as MBS (methyl methacrylate/butadiene/styrene) copolymers, including Clearstrength® C303H from Arkema, and acrylic modifiers of core-shell type, such as the Durastrength® products from Arkema,
  blowing agents, such as azodicarbonamides, azobisisobutyronitrile or diethyl azobisisobutyrate,
  flame retardants, including antimony trioxide, zinc borate and brominated or chlorinated phosphate esters,
  solvents, and
  their mixtures.

The composition according to the invention can be used in the manufacture of various articles, in particular by calendering, extrusion, extrusion-blow molding, injection molding, rotomolding, thermoforming, and the like.

They can thus be used to manufacture films, fibers, blown or extruded parts or injection-molded parts. These parts may be intended for the manufacture of bathroom installation articles, hydraulic parts, furnishings, motor vehicle parts, medical items, electronic devices or packaging systems.

A better understanding of the invention will be obtained in the light of the following examples, which are given purely for illustrative purposes and which do not have the aim of limiting the scope of the invention, which is defined by the appended claims.

BRIEF DESCRIPTION OF THE DRAWING

FIG. 1 represents elongation at break for a polymer of the invention compared to ungrafted polymers.

EXAMPLES

Example 1

Preparation of Grafted Polyamides

1—Synthesis of Polyamides 11

Polyamides 11 are prepared in a glass tube in an amount of 50 or 100 grams. The following preparation method was used: the monomers consisting of aminoundecanoic acid were introduced into the reactor equipped with an anchor stirrer and placed in an oil bath at 245° C. A diacid, adipic acid, was added in a proportion of one molecule per chain. The diacid made it possible to control the growth of the chains and thus their weight and to obtain polyamides carrying acid functional groups at both ends. The reaction was carried out while flushing with nitrogen in order to remove the water given off during the polycondensation. A Dean and Stark apparatus was used to recover possible compounds liquid at ambient temperature carried away by the nitrogen stream and a bubbler made it possible to confirm the presence of the nitrogen flushing. The reactions were halted after 1 h 30 at 245° C.

2—Grafting of the Polyamides

This grafting is an acid aminolysis resulting in an amide. A polyamide prepared above, of molecular weight Mn=2500 g/mol, and UDETA are introduced. The level of UDETA introduced was 10%. As the reaction is similar to that carried out during the synthesis of the polyamides, it was carried out in similar equipment to that used in the first stage, except that a Vigreux column was inserted between the outlet of the reactor and the condenser for the purpose of preventing a portion of the modifying agent, UDETA, from being removed by the nitrogen stream. The reactor was also immersed in an oil bath at 240° C., the temperature inside the reactor being in the vicinity of 230° C. The reaction was continued for 2 h 30. The system was then placed under vacuum for a period of a few minutes (10-30 min) in order to extract the water given off which was not carried away with the nitrogen stream and optionally the unreacted UDETA.

Example 2

Preparation of Grafted PMMA

A modifying agent, namely UDETA, was grafted to copolymers of methyl methacrylate, of methacrylic acid and of glutaric anhydride, themselves obtained by partial cyclization of copolymers of methyl methacrylate and of methacrylic acid. Two polymers thus modified were used.

Example 2A

Grafting to a Commercial Polymer

A copolymer of methyl methacrylate and of methacrylic acid sold by Arkema under the name Altuglas® HT121 (copolymer comprising approximately 5% by weight of methacrylic acid) was partially cyclized by placing it in an oven under vacuum at 235° C. for 24 hours. The acid groups of the starting copolymer have a tendency to cyclize to more than 90% by reaction either with a neighboring acid group (departure of water) or with a neighboring methyl ester group (departure of methanol).

The copolymer thus obtained was subsequently grafted by extrusion as a blend with UDETA in a DSM twin-screw microextruder equipped with a recirculation channel and having a capacity of 15 g. The rotational speed of the screws was set at 200 revolutions per minute and the temperature at 230° C., flushing with nitrogen making it possible to prevent decomposition of the materials. The UDETA was introduced in a proportion of 4.5% by weight, with respect to the copolymer/UDETA combination. The residence time of the polymer/UDETA blend in the micro-extruder was set at 5 minutes. The polymer thus grafted is referred to as HT121g.

Example 2B

Grafting to a Polymer of Low Weight

A similar method was used for a polymer of low weight synthesized in the laboratory (referred to as PMMA3). Its number-average weight was approximately 11 000 g/mol and its content of methacrylic acid was approximately 10%. The cyclization method was identical to that of example 2A.

The grafting method was also identical, except for the blending temperature, which was set at 200° C., and the level of UDETA introduced, which was 8% by weight. The polymer thus modified is referred to as PMMA3g.

Example 3

Preparation of a Grafted Olefinic Copolymer

A modifying agent, namely UDETA, was grafted to a copolymer of ethylene, of butyl acrylate and of maleic anhydride (Lotader® 3210 from Arkema) including approximately 3% of maleic anhydride monomers.

This copolymer was grafted by extrusion in the presence of UDETA in a DSM twin-screw microextruder equipped with a recirculation channel and having a capacity of 15 g. The rotational speed of the screws was set at 200 revolutions per minute and the temperature at 160° C., flushing of nitrogen making it possible to prevent decomposition of the materials. The UDETA was introduced in a proportion of 2.8% by weight, with respect to the copolymer/UDETA combination. The residence time of the polymer/UDETA blend in the micro-extruder was set at 5 minutes.

Example 4

Compatibilization Studies

Example 4A

PMMA/PA-11 Blend

A study was carried out on the compatibilization of three blends A, B and C, each composed: (a) of 20% by weight of a grafted polyamide analogous to that of example 1, except in two cases (PA with a weight of 5000 and 10 000 g/mol) where the UDETA had been introduced with the monomers at the beginning of the polycondensation, and (b) of 80% by weight of the grafted acrylic polymer HT121g obtained in example 2A. The blends A to C respectively comprised 2500, 5000 and 10 000 g/mol grafted PA-11. For the grafted PA-11 polymers with weights of 5000 and 10 000 g/mol, the levels of UDETA which were introduced during the synthesis were 5% and 2.5% respectively.

These blends of grafted polymers were produced by passing the polymers through a microextruder at 200° C., the rotational speed being set at 60 revolutions per minute, for 9 minutes.

Each of the blends was observed under a transmission electron microscope, in comparison with similar PMMA/PA-11 blends in which the two polymers were not grafted. From these observations, it emerges that the grafted polymers form, according to the invention, co-continuous blends (blend A) or blends including much smaller spherical PA-11 nodules in the PMMA matrix (blends B and C) than the blends formed from the same ungrafted polymers.

This example thus demonstrates that the modification of the two immiscible polymers by grafting associative groups makes it possible to render them more compatible with one another.

In addition, it was confirmed that the blend of grafted polymers A was not soluble in chloroform, in contrast to the blend of the same ungrafted polymers. It follows that the first exhibits better resistance to solvents than the second.

Example 4B

PMMA/Olefinic Copolymer Blend Comprising an Olefinic Copolymer Matrix

A study was carried out on the compatibilization of a blend produced in a microextruder and comprising: (a) 20% by weight of the grafted PMMA "PMMA3g" obtained in example 2B and (b) 80% by weight of the grafted olefinic copolymer obtained in example 3 (hereinafter "3210g").

It was observed with the naked eye that the blend of grafted polymers was translucent, whereas a blend composed of the same ungrafted polymers was opaque. In addition, the blend of grafted polymers exhibited a greater elongation at break (approximately 370% instead of approximately 150% for a rate of displacement of 10 mm/min) than the blend of the same ungrafted polymers, as emerges from the appended FIG. 1, and also a greatly improved cohesion at the interfaces (the detachment at the nodule/matrix interface occurring at a much higher strain).

Example 4C

PMMA/Olefinic Copolymer Blend Comprising a PMMA Matrix

The blend comprised 20% by weight of grafted olefinic copolymer "3210g" (prepared as described in example 3) and 80% by weight of grafted PMMA "HT121g" (prepared as described in example 2A). An increase in the modulus and in the tensile strength of the blend of grafted polymers (respectively 1073 MPa and 36.5 MPa) was noted in comparison with the blend of ungrafted polymers (respectively 1020 MPa and 23.6 MPa). Furthermore, a far greater number of detachments at interfaces was observed for the blend of ungrafted polymers, despite a much lower strain at break.

These results again show that the process according to the invention makes it possible to improve the compatibility of two polymers and consequently to improve the mechanical and optical properties of the blend.

What is claimed is:
1. A process for increasing the compatibility between at least two polymers, comprising:

(a) the selection of at least two immiscible polymers (A) and (B), wherein the polymer (A) is an acrylic polymer and the polymer (B) is a polyamide, at least one of which does not carry an associative group based on a nitrogenous heterocycle, (b) the modification of the polymer (A) and/or of the polymer (B) in order to obtain a blend of polymers (Pi) resulting from the polymers (A) and (B) which each carry associative groups based on a nitrogenous heterocycle, said associative groups being present in an amount sufficient for the polymers (Pi) to be more compatible with one another than the polymers (A) and (B), wherein the blend of (A) and (B) exhibits a single glass transition temperature.

2. The process as claimed in claim 1, wherein the acrylic polymer is a homo- or copolymer of alkyl (meth)acrylate.

3. The process as claimed in claim 1, wherein the modification of the polymer (A) and/or of the polymer (B) is carried out by reaction of said polymer with a modifying agent carrying an associative group based on a nitrogenous heterocycle and a reactive group said reactive group forming a covalent bond with a reactive functional group, carried by said polymer (A) and/or (B).

4. The process as claimed in claim 3, wherein said reactive functional group is an anhydride functional group and in that it is created on said polymer (A) and/or (B) by cyclization of acid functional groups.

5. The process as claimed in claim 3, wherein said reactive functional group is an anhydride functional group and in that it is created on said polymer (A) and/or (B) by radical grafting of maleic anhydride.

6. The process as claimed in claim 1, wherein said nitrogenous heterocycle is chosen from imidazolidonyl, triazolyl, triazinyl, bisureyl and ureidopyrimidyl groups.

7. A composition formed of polymers which is capable of being obtained according to a process as claimed in claim 1.

8. The process as claimed in claim 3, wherein the reactive group is chosen from amine, mercaptan, epoxy, isocyanate, anhydride, alcohol or acid groups.

9. The process as claimed in claim 3, wherein the reactive functional group is chosen from an acid, anhydride, alcohol, mercaptan, amine, epoxy or isocyanate functional group.

10. The process as claimed in claim 6, wherein said nitrogenous heterocycle is an imidazolidonyl group.

* * * * *